United States Patent [19]

Wannagat et al.

[11] Patent Number: 5,258,169

[45] Date of Patent: Nov. 2, 1993

[54] SILICON DIIMIDE, A PROCESS FOR ITS PREPARATION AND SILICON NITRIDE OBTAINED THEREFROM

[75] Inventors: Ulrich Wannagat, Wolfenbüttel; Adrian Schervan, Hamm; Martin Jansen, Bonn; Hans-Peter Baldus, Burscheid; Aloys Eiling, Bochum, all of Fed. Rep. of Germany

[73] Assignee: Bayer Aktiengesellschaft, Leverkusen, Fed. Rep. of Germany

[21] Appl. No.: 763,314

[22] Filed: Sep. 20, 1991

[30] Foreign Application Priority Data

Oct. 2, 1990 [DE] Fed. Rep. of Germany ....... 4031070

[51] Int. Cl.$^5$ .............................................. C01B 21/068
[52] U.S. Cl. ...................................... 423/344; 501/97; 546/2; 546/3; 546/14
[58] Field of Search ..................... 423/344, 324; 546/2, 546/3, 14; 501/97

[56] References Cited

U.S. PATENT DOCUMENTS

| | | | |
|---|---|---|---|
| 4,196,178 | 4/1980 | Iwai et al. | 423/344 |
| 4,387,079 | 6/1983 | Kasai et al. | 423/344 |
| 4,613,490 | 9/1986 | Syzyju et al. | 423/344 |
| 4,686,095 | 8/1987 | Beckwith et al. | 423/344 |
| 4,725,660 | 2/1988 | Serita et al. | 528/28 |
| 4,795,622 | 1/1989 | Isoda et al. | 423/344 |

FOREIGN PATENT DOCUMENTS

| | | | |
|---|---|---|---|
| 0225412 | 6/1987 | European Pat. Off. | |
| 0315953 | 5/1989 | European Pat. Off. | |
| 3516589 | 11/1985 | Fed. Rep. of Germany | |
| 58-213607 | 12/1983 | Japan | 423/344 |
| 61-174108 | 8/1986 | Japan | 423/344 |
| 63-39885 | 2/1988 | Japan | 423/344 |
| 63-112406 | 5/1988 | Japan | 423/344 |

Primary Examiner—R. Bruce Breneman
Attorney, Agent, or Firm—Connolly & Hutz

[57] ABSTRACT

Silicon diimide having a carbon content of at most 0.5% by weight and a chlorine content of at most 20 ppm is prepared by reacting ammonia with organyl amino silane at 50°–300° C. at elevated pressure and is useful as an intermediate for high grade silicon nitride.

11 Claims, No Drawings

SILICON DIIMIDE, A PROCESS FOR ITS PREPARATION AND SILICON NITRIDE OBTAINED THEREFROM

The present invention relates to highly pure silicon diimide Si(NH)$_2$ a process for its preparation and silicon nitride obtained therefrom.

BACKGROUND OF THE INVENTION

Silicon nitride is one of the most promising high performance materials by virtue of its strength, its resistance to temperature changes and its corrosion resistance. It is used as heat resistant material in the construction of engines and turbines and in cutting tools.

Various processes for the preparation of silicon nitride by way of silicon diimide as intermediate stage have become known. They are based on the reaction of SiCl$_4$ or SiS$_2$ with ammonia at high or low temperatures and may be divided into four groups.

1. Reaction between a liquid phase containing SiCl$_4$ and liquid ammonia at normal pressure or elevated pressure (U.S. Pat. No. 4,196,178).
2. Reaction between SiCl$_4$ vapor and gaseous ammonia at elevated temperature (U.S. Pat. No. 4,145,224).
3. Reaction of SiS$_2$ with liquid ammonia (M. Blix and W. Wirbelauer, Ber. Deut. Chem. Ges. 36, 4220 (1903)).
4. Reaction of liquid SiCl$_4$ with solid ammonia (O. Glemser and E. Naumann in "Über den thermischen Abbau von Siliciumdiimid", Z. Anorg. Allg. Chem. 289, page 134, (1959)).

The four processes mentioned here have significant defects which either lie in the process itself or lead to products having unsatisfactory properties. These defects are described in detail below.

The reaction of liquid SiCl$_4$ with liquid ammonia is highly exothermic and therefore very difficult to control. NH$_4$Cl formed as by-product frequently blocks up the reaction apparatus.

In the process described in U.S. Pat. No. 4,196,178 one objective is to control the very vigorous reaction of SiCl$_4$ with NH$_3$ by dilution of the silicon tetrachloride with organic solvents. The organic solvents, however, introduce considerable quantities of carbon into the product, which seriously impair the capacity of the ceramic powder to sinter.

The second method described above, the reaction of gaseous SiCl$_4$ and ammonia at about 1300° C. to form Si$_3$N$_4$, has the great advantage that, theoretically, the only by-product formed in addition to the desired product is hydrogen chloride, which should be very easy to remove from the solid product. In practice, however, silicon nitride prepared by this method still contains a considerable quantity of chemically bound chlorine, which can only be removed with great difficulty.

The silicon diimide which is prepared by the reaction of SiS$_2$ with ammonia is also found to be insufficiently pure owing to significant proportions of sulphur remaining in the product.

The above-described process for the preparation of silicon diimide by the reaction of solid ammonia with liquid SiCl$_4$ is disadvantageous in two respects: firstly, on account of the great technical expenditure required for this method of preparation; secondly, on account of the lack of reaction control due to the fact that the exothermic reaction of SiCl$_4$ with ammonia causes the latter to melt.

U.S. Pat. No. 4,725,660 discloses a process by which Si(NHCH$_3$)$_4$ is reacted with NH$_3$ in the absence of solvents at temperatures above the melting point of the silane to form polysilazane having the composition Si(NH)$_2$. The product is obtained in the form of a resin. After it has been pyrolyzed, the product of pyrolysis still contains about 16% of carbon. In fact, therefore, only a polysilazane containing carbon can be obtained by this process owing to premature polymerization.

It is an object of the present invention to provide a silicon diimide which does not have the disadvantages described above and is suitable for further processing to high quality Si$_3$N$_4$.

BRIEF DESCRIPTION OF THE INVENTION

This objective is achieved by a silicon diimide with a low carbon content (maximum of 0.5% by weight of carbon) and a low chlorine content (maximum 20 ppm). Such silicon diimide is obtained by reacting organylamino silane with ammonia at 50° C. to 300° C. under pressure.

DETAILED DESCRIPTION

The silicon diimide of this invention has the general formula Si(NH$_y$)$_z$, where y is 1 to 2, and z is 2 to 4.

It is characterized in that it has a carbon content of at most 0.5% by weight and a chlorine content of at most 20 ppm.

The chlorine content of the silicon diimide according to the invention is preferably less than 10 ppm and the silicon diimide is free from sulphur.

This invention also relates to a process for the preparation of the silicon diimide according to the invention, in which an organyl aminosilane corresponding to the general formula Si(NRR')$_4$, where R and R' may be identical or different and stand for C$_1$-C$_6$-alkyl, vinyl, phenyl or hydrogen, is reacted with ammonia at temperatures from 50° C. to 300° C. and at an elevated pressure to form silicon diimide.

The silicon diimide according to the invention and organylamine are then obtained from a chlorine free tetraorganylaminosilane Si(NRR')$_4$ and ammonia.

The preparation of chlorine-free Si(NRR')$_4$ is the subject matter of German Patent Application P 40 01 246.8.

The organylamine obtained from this reaction in the form of a hydrochloride can easily be recycled. If higher liquid aminosilanes are used, the product may be slightly contaminated with chlorine from organylamine hydrochloride which has not been completely separated. It is therefore preferred to use a tetraorganylsilane in which R=CH$_3$ and R'=H.

The variation of the process according to the invention in which R=C$_2$H$_5$ and R'=H is also preferred.

The organylaminosilane thus obtained is preferably introduced into an enamel or Hastelloy autoclave under inert gas and reacted with highly pure ammonia at temperatures from 20° to 300° C. and pressures from 1 to 200 bar to form Si(NH)$_2$.

The molar ratio of organylaminosilane to ammonia should preferably be from 1:3 to 1:1000, most preferably 1:15.

After a reaction time of from 2 to 120 hours (depending on the aminosilane used), the aminosilane has been converted into silicon diimide. For complete transamination, the product obtained is isolated and introduced into an ammoniacal atmosphere for 20 minutes to 6 hours at a temperature from 600° C. to 1200° C.

The powder obtained may be identified by determination of the nitrogen, oxygen and carbon content and by DTA-TG measurements.

The oxygen and carbon contents of the diimide thus treated are preferably below 1.0% by weight and below 0.5% by weight, respectively (determined with O-N-Mat and C-S-MAT apparatus of Ströhlein, 4044 Karst 1, Germany).

The silicon diimide according to the invention is eminently suitable for further working up into $Si_3N_4$. For this purpose, it is heated at 1000° to 1500° C., preferably about 1450° C., for 20 minutes to 12 hours in nitrogen-containing atmosphere for conversion into $\alpha$-$Si_3N_4$.

The thus obtained $Si_3N_4$ according to the invention, which is also a subject matter of this invention, consists to an extent of more than 80% by weight of the $\alpha$-phase and contains at least 38.5% by weight of nitrogen; chlorine cannot be detected. The oxygen content and carbon content of the silicon nitride according to the invention are preferably less than 1% and less than 0.1%, respectively.

The invention is described below by way of example, which should not be regarded as a limitation.

EXAMPLE 1

10 g of $Si(NHCH_3)_4$ are introduced into a Teflon lined 500 ml stirrer autoclave under protective gas and the autoclave is sealed. 200 ml of highly pure ammonia are then forced in and the autoclave is heated to 100° C. at the rate of 5° C./min and left at this temperature for 24 hours. The pressure in the autoclave at this temperature is about 60 bar.

After termination of the reaction, the pressure in the autoclave is released and the white, pulverulent diimide is calcined in an oven at about 800° C. for about 30 minutes in a stream of ammonia for complete transamination.

The yield is quantitative.

| Analysis | | | |
|---|---|---|---|
| Si: | 49.0% by wt. | N: | 48.0% by wt. |
| H: | 1.9% by wt. | C: | 0.1% by wt. |
| Cl: | 0.0006% by wt. | O: | 0.8% by wt. |

EXAMPLE 2

10 g of $Si(NH-C_2H_5)_4$ are introduced into a Teflon lined 500 ml stirrer autoclave under protective gas and the autoclave is sealed. 250 ml of highly pure ammonia are then forced in and the autoclave is heated to 100° C. at the rate of 5° C./min and left at this temperature for 48 hours. The pressure in the autoclave at this temperature is about 100 to 110 bar.

After termination of the reaction, the pressure in the autoclave is released and the white, pulverulent diimide is calcined in an oven at about 800° C. for about 30 minutes in a stream of ammonia for complete transamination.

| Analysis | | | |
|---|---|---|---|
| Si: | 48.4% by wt. | N: | 48.5% by wt. |
| H: | 2.0% by wt. | C: | 0.3% by wt. |
| Cl: | 0.1% by wt. | O: | 0.6% by wt. |

The higher chlorine content of the silicon diimide prepared from tetrakisethylaminosilane is due to incomplete separation of the ethylamino hydrochloride from the aminosilane.

EXAMPLE 3

The powder obtained according to Example 1 is heated to 1450° C. at the rate of 10° C./min and tempered at this temperature for about 3 hours in a highly pure nitrogen atmosphere.

| Analysis | | | |
|---|---|---|---|
| Si: | 60.3% by wt. | N: | 39.3% by wt. |
| C: | 0.05% by wt. | Cl: | not detectable |
| O: | 0.2% by wt. | | |

Surface area according to BET: 20 $m^2/g$
Particle size: from 0.1 to 0.8 $\mu m$.

What is claimed is:

1. A process for the preparation of silicon diimide having a carbon content of at most 0.5% by weight and a chlorine content of at most 20 ppm which comprises reacting ammonia with an organylaminosilane corresponding to the formula $Si(NRR')_4$ where R and R' are identical or different and stand for $C_1$-$C_6$-alkyl, vinyl, phenyl or hydrogen at temperatures from 50° C. to 300° C. at elevated pressure to form silicon diimide.

2. A process according to claim 1, wherein R is $CH_3$ and R' is H.

3. A process according to claim 1, wherein R is $C_2H_5$ and R' is H.

4. A process according to claim 1, wherein the molar ratio of organylaminosilane to ammonia is from 1:3 to 1:1000.

5. A process according to claim 1, wherein the reaction product obtained is treated for 20 minutes to 6 hours with an ammoniacal atmosphere at from 600° C. to 1200° C.

6. A process according to claim 1, wherein after the silicon diimide is obtained, it is converted into silicon nitride by heating in a nitrogen-containing atmosphere at from 1000° to 1500° C. for 20 minutes to 12 hours.

7. $Si_3N_4$ prepared by the process according to claim 6 and consisting of silicon nitride having more than 80% by weight of the alpha phase and more than 38.5% by weight of nitrogen with no detectable chlorine.

8. Silicon diimide having a carbon content of less than 0.1% by weight and a chlorine content of at most 20 ppm.

9. Silicon diimide according to claim 8, wherein said chlorine content is less than 10 ppm.

10. A process according to claim 1, wherein said elevated pressure is from 1 to 200 bar.

11. A process according to claim 10, wherein said elevated pressure is from 60 to 200 bar.

* * * * *